United States Patent
Sanchez Rola et al.

(10) Patent No.: US 12,153,713 B1
(45) Date of Patent: Nov. 26, 2024

(54) SYSTEMS AND METHODS FOR PROTECTING USER DATA PRIVACY BY DETECTING THE EXTENSION OF TRACKER COVERAGE OF WEBSITE BROWSING SESSIONS THROUGH INDIRECT DATA DISCLOSURE

(71) Applicant: GEN DIGITAL INC., Tempe, AZ (US)

(72) Inventors: Iskander Sanchez Rola, Antibes (FR); David Luz Silva, Dublin (IE)

(73) Assignee: GEN DIGITAL INC., Tempe, AZ (US)

( * ) Notice: Subject to any disclaimer, the term of this patent is extended or adjusted under 35 U.S.C. 154(b) by 254 days.

(21) Appl. No.: 17/656,074

(22) Filed: Mar. 23, 2022

(51) Int. Cl.
*G06F 21/62* (2013.01)
*G06F 40/14* (2020.01)

(52) U.S. Cl.
CPC .......... *G06F 21/6263* (2013.01); *G06F 40/14* (2020.01)

(58) Field of Classification Search
CPC .............................. G06F 21/6263; G06F 40/14
See application file for complete search history.

(56) References Cited

U.S. PATENT DOCUMENTS

| | | | | |
|---|---|---|---|---|
| 5,974,572 A * | 10/1999 | Weinberg | ............... | G06Q 30/02 714/E11.181 |
| 6,732,162 B1 * | 5/2004 | Wood | ................... | H04L 65/762 709/219 |
| 7,877,800 B1 * | 1/2011 | Satish | .................... | H04L 67/02 726/25 |
| 8,166,406 B1 * | 4/2012 | Goldfeder | ........... | G06F 21/6263 709/224 |
| 8,280,873 B1 * | 10/2012 | Brewer | ............... | G06F 16/9535 707/602 |
| 8,578,036 B1 * | 11/2013 | Holfelder | ............ | G06F 21/6263 709/224 |
| 8,578,496 B1 * | 11/2013 | Krishnappa | ........... | G06F 21/316 713/188 |
| 8,682,977 B1 * | 3/2014 | Roy | ...................... | G06F 16/954 709/205 |
| 8,713,424 B1 * | 4/2014 | Kuhn | .................. | G06F 16/9574 715/234 |
| 8,745,753 B1 * | 6/2014 | Gottlieb | ............. | G06Q 30/0277 726/26 |

(Continued)

*Primary Examiner* — Aravind K Moorthy
(74) *Attorney, Agent, or Firm* — Greenberg Traurig, LLP

(57) ABSTRACT

The disclosed computer-implemented method for protecting user data privacy by detecting the extension of tracker coverage of website browsing sessions through indirect data disclosure may include (i) navigating to an origin website during a new web browsing session, (ii) analyzing the origin website to detect clickable elements and tracking domains, (iii) identifying webpage navigation information for destination websites and resources loaded by the tracking domains, (iv) grouping the webpage navigation information for the destination websites by a common destination tracking domain, (v) determining web trackers extending a tracker coverage from the origin website to the destination websites, and (vi) performing a security action that protects against a potential invasion of user data privacy by providing a notification of the extended tracker coverage during a browsing session in the origin website. Various other methods, systems, and computer-readable media are also disclosed.

20 Claims, 7 Drawing Sheets

(56) References Cited

U.S. PATENT DOCUMENTS

| | | | |
|---|---|---|---|
| 8,935,797 B1* | 1/2015 | Silver | G06F 21/6254 |
| | | | 726/26 |
| 8,938,773 B2* | 1/2015 | Hubbard | H04L 63/123 |
| | | | 726/13 |
| 9,043,928 B1* | 5/2015 | Paczkowski | G06F 21/00 |
| | | | 726/28 |
| 9,081,953 B2* | 7/2015 | B'Far | G06F 21/50 |
| 9,465,717 B2* | 10/2016 | Delio, Jr. | G06F 11/3466 |
| 9,785,619 B1* | 10/2017 | Hill | G06F 16/9574 |
| 9,824,332 B1* | 11/2017 | Everton | H04L 63/0428 |
| 10,013,577 B1* | 7/2018 | Beaumont | H04L 63/102 |
| 10,108,817 B2* | 10/2018 | Riva | H04L 63/0421 |
| 10,129,346 B1* | 11/2018 | Roy | H04L 67/535 |
| 10,212,170 B1* | 2/2019 | Canavor | H04L 63/083 |
| 10,237,302 B1* | 3/2019 | Kras | H04L 63/1483 |
| 10,277,628 B1* | 4/2019 | Jakobsson | H04L 63/1483 |
| 10,678,923 B1* | 6/2020 | Siev | G06Q 30/0275 |
| 10,733,638 B1* | 8/2020 | Jain | G06F 16/9574 |
| 10,771,504 B2* | 9/2020 | Angara | H04L 63/1491 |
| 10,868,825 B1* | 12/2020 | Dominessy | H04L 43/045 |
| 10,911,483 B1* | 2/2021 | Wasiq | H04L 67/02 |
| 11,050,787 B1* | 6/2021 | Sharifi Mehr | G06F 9/45558 |
| 11,055,749 B1* | 7/2021 | Choi | G06Q 30/0276 |
| 11,068,931 B1* | 7/2021 | Luttrell | G06Q 30/0246 |
| 11,102,316 B1* | 8/2021 | Khoo | H04L 51/42 |
| 11,140,136 B1* | 10/2021 | Li | H04L 63/0414 |
| 11,381,600 B1* | 7/2022 | Wang | H04L 63/168 |
| 11,397,594 B1* | 7/2022 | David | G06F 9/44526 |
| 11,436,371 B2* | 9/2022 | Beigi | G06F 16/9536 |
| 11,444,976 B2* | 9/2022 | Brannon | H04L 63/168 |
| 11,449,637 B1* | 9/2022 | Sanchez Rola | G06F 21/6245 |
| 11,489,910 B1* | 11/2022 | Toval | H04L 67/306 |
| 11,528,257 B1* | 12/2022 | Sanchez Rola | H04L 67/146 |
| 11,533,543 B1* | 12/2022 | Suh | H04N 21/4316 |
| 11,562,298 B1* | 1/2023 | Bayandin | G06N 20/00 |
| 11,595,437 B1* | 2/2023 | Mushtaq | H04L 63/1483 |
| 11,640,479 B1* | 5/2023 | Sanchez | G06F 21/6245 |
| | | | 726/26 |
| 11,711,343 B2* | 7/2023 | Chambers | H04L 63/0428 |
| | | | 713/156 |
| 11,757,914 B1* | 9/2023 | Jakobsson | H04L 51/212 |
| | | | 726/25 |
| 11,882,152 B2* | 1/2024 | Kurrasch | H04L 63/126 |
| 11,989,253 B2* | 5/2024 | Abrahami | G06F 40/14 |
| 2002/0116494 A1* | 8/2002 | Kocol | G06Q 30/0257 |
| | | | 709/224 |
| 2003/0001854 A1* | 1/2003 | Jade | G06F 9/454 |
| | | | 345/581 |
| 2003/0120649 A1* | 6/2003 | Uchino | G06F 16/30 |
| | | | 707/999.005 |
| 2004/0122943 A1* | 6/2004 | Error | H04L 67/535 |
| | | | 709/224 |
| 2005/0256887 A1* | 11/2005 | Eiron | G06F 16/951 |
| 2007/0079009 A1* | 4/2007 | Cama | G06Q 10/107 |
| | | | 709/246 |
| 2007/0094500 A1* | 4/2007 | Shannon | G06F 21/645 |
| | | | 713/170 |
| 2007/0185855 A1* | 8/2007 | Shah | G06F 16/9535 |
| | | | 707/999.005 |
| 2008/0235368 A1* | 9/2008 | Nagaraj | H04L 67/02 |
| | | | 709/224 |
| 2008/0249855 A1* | 10/2008 | Collins | G06Q 30/0256 |
| | | | 705/14.54 |
| 2008/0263659 A1* | 10/2008 | Alme | G06F 21/56 |
| | | | 726/22 |
| 2009/0031245 A1* | 1/2009 | Brezina | G06F 16/24575 |
| | | | 707/999.1 |
| 2010/0050245 A1* | 2/2010 | Samatov | H04L 9/32 |
| | | | 705/28 |
| 2010/0169971 A1* | 7/2010 | Raviv | H04L 63/1408 |
| | | | 726/23 |
| 2011/0208850 A1* | 8/2011 | Sheleheda | G06F 16/9535 |
| | | | 709/223 |
| 2011/0264673 A1* | 10/2011 | White | G06F 16/9535 |
| | | | 707/750 |
| 2011/0289582 A1* | 11/2011 | Kejriwal | H04L 63/14 |
| | | | 726/22 |
| 2012/0036011 A1* | 2/2012 | Schechter | G06F 21/6263 |
| | | | 707/E17.014 |
| 2012/0084133 A1* | 4/2012 | Ross | G06Q 30/0226 |
| | | | 709/224 |
| 2012/0174236 A1* | 7/2012 | Goodwin | G06F 21/6263 |
| | | | 726/27 |
| 2012/0271805 A1* | 10/2012 | Holenstein | G06F 16/955 |
| | | | 707/706 |
| 2012/0324094 A1* | 12/2012 | Wyatt | H04W 4/60 |
| | | | 709/224 |
| 2012/0324568 A1* | 12/2012 | Wyatt | H04W 12/128 |
| | | | 726/13 |
| 2013/0117214 A1* | 5/2013 | Davis | G06Q 50/01 |
| | | | 706/46 |
| 2013/0254377 A1* | 9/2013 | Lee | H04L 43/04 |
| | | | 709/224 |
| 2013/0276131 A1* | 10/2013 | Bjones | G06F 21/6263 |
| | | | 726/26 |
| 2014/0068411 A1* | 3/2014 | Ross | G06F 17/00 |
| | | | 715/234 |
| 2014/0164385 A1* | 6/2014 | Liu | G06F 16/337 |
| | | | 707/740 |
| 2014/0165177 A1* | 6/2014 | Alagha | H04L 63/168 |
| | | | 726/9 |
| 2014/0282917 A1* | 9/2014 | Peckover | H04L 63/10 |
| | | | 726/4 |
| 2015/0067151 A1* | 3/2015 | Sands | H04L 67/55 |
| | | | 709/224 |
| 2015/0096018 A1* | 4/2015 | Mircescu | G06F 21/56 |
| | | | 726/23 |
| 2015/0106889 A1* | 4/2015 | Sharabani | G06F 16/95 |
| | | | 726/5 |
| 2015/0117624 A1* | 4/2015 | Rosenshine | H04M 3/42042 |
| | | | 379/142.04 |
| 2015/0135167 A1* | 5/2015 | Berk | G06F 11/3636 |
| | | | 717/128 |
| 2015/0163116 A1* | 6/2015 | Ding | H04L 67/535 |
| | | | 709/224 |
| 2015/0346929 A1* | 12/2015 | Karunamuni | G06F 3/0488 |
| | | | 715/777 |
| 2016/0026822 A1* | 1/2016 | Weis | H04L 67/535 |
| | | | 726/28 |
| 2016/0092914 A1* | 3/2016 | Wiener | G06Q 30/0277 |
| | | | 705/14.45 |
| 2016/0162454 A1* | 6/2016 | Bargagni | G06F 40/103 |
| | | | 715/745 |
| 2016/0170778 A1* | 6/2016 | Kalyanpur | G06F 9/451 |
| | | | 703/22 |
| 2016/0371507 A1* | 12/2016 | Jakobsson | H04L 67/143 |
| 2017/0032147 A1* | 2/2017 | Denner | H04L 67/535 |
| 2017/0070539 A1* | 3/2017 | Sachs | G06F 16/22 |
| 2017/0126730 A1* | 5/2017 | Oberheide | H04L 63/1483 |
| 2017/0220681 A1* | 8/2017 | Daas | G06F 40/186 |
| 2017/0286558 A1* | 10/2017 | Kelleher | G06F 11/323 |
| 2017/0308513 A1* | 10/2017 | Hunt | G06F 40/205 |
| 2017/0318045 A1* | 11/2017 | Johns | H04L 63/168 |
| 2018/0293072 A1* | 10/2018 | Jhi | G06F 21/52 |
| 2018/0309772 A1* | 10/2018 | Song | H04L 63/101 |
| 2018/0341981 A1* | 11/2018 | Aftab | G06Q 30/0255 |
| 2019/0007506 A1* | 1/2019 | Xu | G06F 16/24578 |
| 2019/0020915 A1* | 1/2019 | Stockhammer | G06F 16/958 |
| 2019/0095616 A1* | 3/2019 | Drapeau | G06F 21/566 |
| 2019/0104154 A1* | 4/2019 | Kumar | G06N 20/00 |
| 2019/0324771 A1* | 10/2019 | Hunt | G06F 9/45512 |
| 2019/0334940 A1* | 10/2019 | Bar Noy | H04L 43/04 |
| 2019/0356623 A1* | 11/2019 | Everton | H04L 51/23 |
| 2020/0042936 A1* | 2/2020 | Jain | G06F 40/14 |
| 2020/0097574 A1* | 3/2020 | Hay | G06F 16/24561 |
| 2020/0097680 A1* | 3/2020 | Hay | G06F 21/6263 |
| 2020/0175096 A1* | 6/2020 | Walker | G06F 40/117 |
| 2020/0279315 A1* | 9/2020 | Manggala | G06F 16/9535 |
| 2020/0311268 A1* | 10/2020 | Kostyushko | G06F 21/561 |
| 2020/0328934 A1* | 10/2020 | Gupta | H04M 15/41 |

(56) References Cited

U.S. PATENT DOCUMENTS

| | | | |
|---|---|---|---|
| 2020/0358818 A1* | 11/2020 | Stoletny | G06F 21/566 |
| 2020/0382554 A1* | 12/2020 | McCarty | G06F 21/6263 |
| 2020/0401491 A1* | 12/2020 | Mohamed | G06F 11/2273 |
| 2020/0410489 A1* | 12/2020 | Williams | H04L 67/535 |
| 2021/0006592 A1* | 1/2021 | Heyman | H04L 63/1483 |
| 2021/0014273 A1* | 1/2021 | Kipp | H04L 67/563 |
| 2021/0021574 A1* | 1/2021 | Gilboy | H04L 67/12 |
| 2021/0021691 A1* | 1/2021 | Galloni | H04L 67/34 |
| 2021/0097594 A1* | 4/2021 | Periyathambi | G06Q 30/08 |
| 2021/0099484 A1* | 4/2021 | Li | G06F 16/2255 |
| 2021/0105298 A1* | 4/2021 | Nagaraja | G06F 21/566 |
| 2021/0117574 A1* | 4/2021 | Abel | G06F 16/951 |
| 2021/0141853 A1* | 5/2021 | Whitney | G06F 21/604 |
| 2021/0160280 A1* | 5/2021 | Yadav | G06F 18/24137 |
| 2021/0185080 A1* | 6/2021 | Wang | H04L 63/1408 |
| 2021/0232653 A1* | 7/2021 | Ivanov | G06F 40/166 |
| 2021/0234832 A1* | 7/2021 | Wood | H04L 63/1408 |
| 2021/0311983 A1* | 10/2021 | Lin-Hendel | G06F 16/45 |
| 2021/0342894 A1* | 11/2021 | Pestana | G06F 21/606 |
| 2021/0382949 A1* | 12/2021 | Yastrebenetsky | G06F 21/577 |
| 2021/0383059 A1* | 12/2021 | Schultz | G06F 40/14 |
| 2022/0030029 A1* | 1/2022 | Kagan | G06F 21/44 |
| 2022/0038497 A1* | 2/2022 | Brannon | H04L 67/535 |
| 2022/0043917 A1* | 2/2022 | Rolle | G06F 21/6209 |
| 2022/0067778 A1* | 3/2022 | Koran | G06Q 30/0259 |
| 2022/0070216 A1* | 3/2022 | Kohavi | H04L 63/1416 |
| 2022/0083691 A1* | 3/2022 | Brannon | G06F 9/547 |
| 2022/0092220 A1* | 3/2022 | Tola | H04L 67/146 |
| 2022/0155917 A1* | 5/2022 | Paterson | G06F 16/338 |
| 2022/0198524 A1* | 6/2022 | Wang | G06F 16/9558 |
| 2022/0215130 A1* | 7/2022 | Edwards | G06F 16/951 |
| 2022/0398345 A1* | 12/2022 | Kravitz | G06F 3/0482 |
| 2023/0007024 A1* | 1/2023 | Maria Vega | H04L 63/1425 |
| 2023/0046426 A1* | 2/2023 | Hariharan | G06Q 30/0277 |
| 2023/0097984 A1* | 3/2023 | Rola | H04L 63/0227 726/26 |

* cited by examiner

SYSTEMS AND METHODS FOR PROTECTING USER DATA PRIVACY BY DETECTING THE EXTENSION OF TRACKER COVERAGE OF WEBSITE BROWSING SESSIONS THROUGH INDIRECT DATA DISCLOSURE

BACKGROUND

Internet browsing activities, including accessing websites over enterprise and home computer networks, often include web tracking during browsing sessions that may compromise user privacy by maintaining and/or utilizing private user data. Comparative approaches for detecting the coverage of web trackers include checking the websites where they are embedded. For example, if a tracker "A" is embedded in 32 of 80 visited websites, the assumption would be that this tracker effectiveness is only 40%. However, these comparative approaches are limited in that they fail to detect referrer information provided by browsers that allow web trackers to extend their coverage to additional websites (e.g., destination websites) visited by users during web browser sessions.

SUMMARY

As will be described in greater detail below, the present disclosure describes various systems and methods for protecting user data privacy by detecting the extension of tracker coverage of website browsing sessions through indirect data disclosure.

In one example, a method for protecting user data privacy by detecting the extension of tracker coverage of website browsing sessions through indirect data disclosure may include (i) navigating, by one or more computing devices, to an origin website during a new web browsing session, (ii) analyzing, by the one or more computing devices, the origin website to detect one or more clickable elements and one or more tracking domains, (iii) identifying, by the one or more computing devices, webpage navigation information for destination websites and resources loaded by the tracking domains in outgoing data traffic associated with a selection of each of the clickable elements in the origin website, (iv) grouping, by the one or more computing devices, the webpage navigation information for each of the destination websites by a common destination tracking domain, (v) determining, by the one or more computing devices, one or more web trackers extending a tracker coverage from the origin website to the destination websites, based on the webpage navigation information and the resources loaded by the tracking domains, and (vi) performing, by the one or more computing devices, a security action that protects against a potential invasion of user data privacy by providing a notification of the extended tracker coverage during a browsing session in the origin website.

In some examples, navigating to the origin website may include (i) initiating the web browsing session in a browser application, (ii) preventing, within the browsing application, a creation of event-driven programming code that masks web server requests, and (iii) browsing to the origin website within the browsing application. In some embodiments, the origin website may be analyzed by (i) identifying hypertext markup language (HTML) elements associated with click events in a webpage associated with the origin website and (ii) identifying HTML elements describing executable web tracking code for loading resources associated with the tracking domains.

In some examples, the webpage navigation information may be identified by (i) detecting one or more universal resource locators (URLs) associated with webpage navigation requests to the destination websites in the outgoing traffic in response to the selection of the clickable elements in the origin website, (ii) storing header information for the clickable elements associated with the page navigation requests, and (iii) executing web tracking code utilized for resource loading by the origin website during the new browsing session to obtain the tracking domains. In some embodiments, the webpage navigation information may be grouped by the common destination tracking domain by (i) truncating each of a set of different URLs associated with the destination websites and (ii) grouping the truncated different URLs by the common destination tracking domain.

In some examples, the web trackers extending tracker coverage may be determined by (i) identifying one or more candidate web trackers that are loaded by the destination websites and absent from the origin website and (ii) determining an estimation range of extended tracker coverage associated with the candidate web trackers. Additionally, the web trackers extending tracker coverage may be determined by (i) hooking into one or more functions in HTML describing the destination websites that allow scripts to detect the origin website, (ii) performing an analysis of an execution of the functions to identify at least one of a target script or a target tracking domain that detects the origin website, and (iii) determining an extended tracker coverage based on the analysis.

In some examples, the security action that protects against a potential invasion of user data privacy may include utilizing a browser extension to provide a real-time notification of the extended tracker coverage during the browser session. Additionally or alternatively, the security action may include including a notification of the potential invasion of user data privacy in a web tracker security alert. Additionally or alternatively, the security action may include adding the notification of the potential invasion of user data privacy to one or more privacy scores generated for privacy invasive web trackers.

In one embodiment, a system for protecting user data privacy by detecting the extension of tracker coverage of website browsing sessions through indirect data disclosure may include at least one physical processor and physical memory comprising computer-executable instructions and one or more modules that, when executed by the physical processor, cause the physical processor to (i) navigate, by a navigation module, to an origin website during a new web browsing session, (ii) analyze, by an analysis module, the origin website to detect one or more clickable elements and one or more tracking domains, (iii) identify, by an identification module, webpage navigation information for destination websites and resources loaded by the tracking domains in outgoing data traffic associated with a selection of each of the clickable elements in the origin website, (iv) group, by a grouping module, the webpage navigation information for each of the destination websites by a common destination tracking domain, (v) determine, by a determining module, one or more web trackers extending a tracker coverage from the origin website to the destination websites, based on the webpage navigation information and the resources loaded by the tracking domains, and (vi) perform, by a security module, a security action that protects against a potential invasion of user data privacy by providing a notification of the extended tracker coverage during a browsing session in the origin website.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) navigate to an origin website during a new web browsing session, (ii) analyze the origin website to detect one or more clickable elements and one or more tracking domains, (iii) identify webpage navigation information for destination websites and resources loaded by the tracking domains in outgoing data traffic associated with a selection of each of the clickable elements in the origin website, (iv) group the webpage navigation information for each of the destination websites by a common destination tracking domain, (v) determine one or more web trackers extending a tracker coverage from the origin website to the destination websites, based on the webpage navigation information and the resources loaded by the tracking domains, and (vi) perform a security action that protects against a potential invasion of user data privacy by providing a notification of the extended tracker coverage during a browsing session in the origin website.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
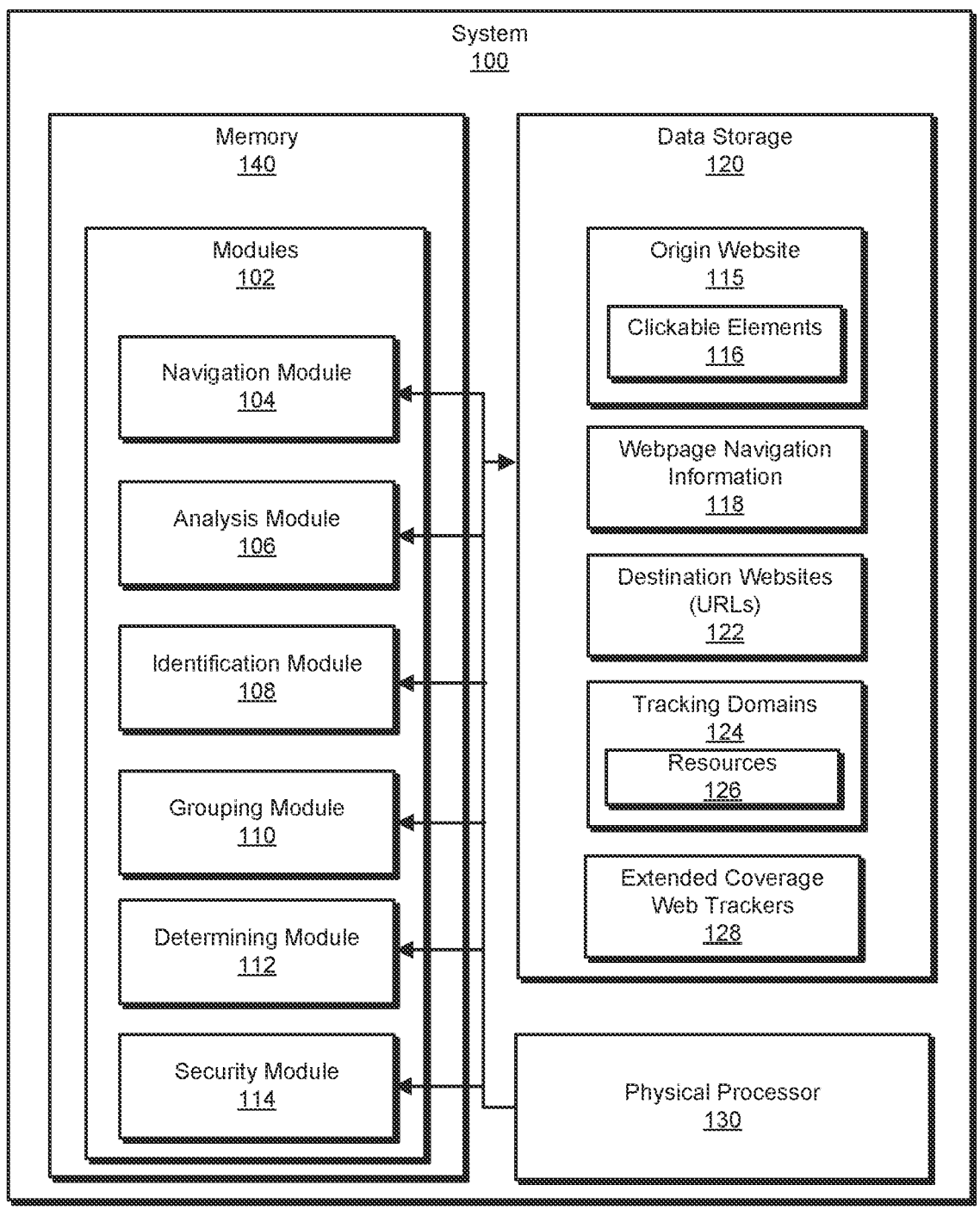
FIG. 1 is a block diagram of an example system for protecting user data privacy by detecting the extension of tracker coverage of website browsing sessions through indirect data disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting user data privacy by detecting the extension of tracker coverage of website browsing sessions through indirect data disclosure. As will be described in greater detail herein, by performing an analysis of website navigations in response to click events, such as mouse clicks, between an origin website and one or more destination websites during a clean browsing session (i.e., origin click analysis) and further performing an analysis of outgoing data traffic to detect referrer information associated with destination domains (i.e., destination referrer check), the systems and methods described herein may identify extended web tracker coverage by trackers that are loaded in the destination websites but not in the origin website, thereby protecting user data privacy by providing information that may be utilized to inform users of potentially privacy invasive web trackers.

In addition, the systems and methods described herein may improve computer network security by identifying the existence of potentially privacy invasive website trackers during web browsing sessions through referral information, thereby protecting against potential privacy attacks (e.g., phishing attacks) by malicious actors utilizing these website trackers.

Figure 2:
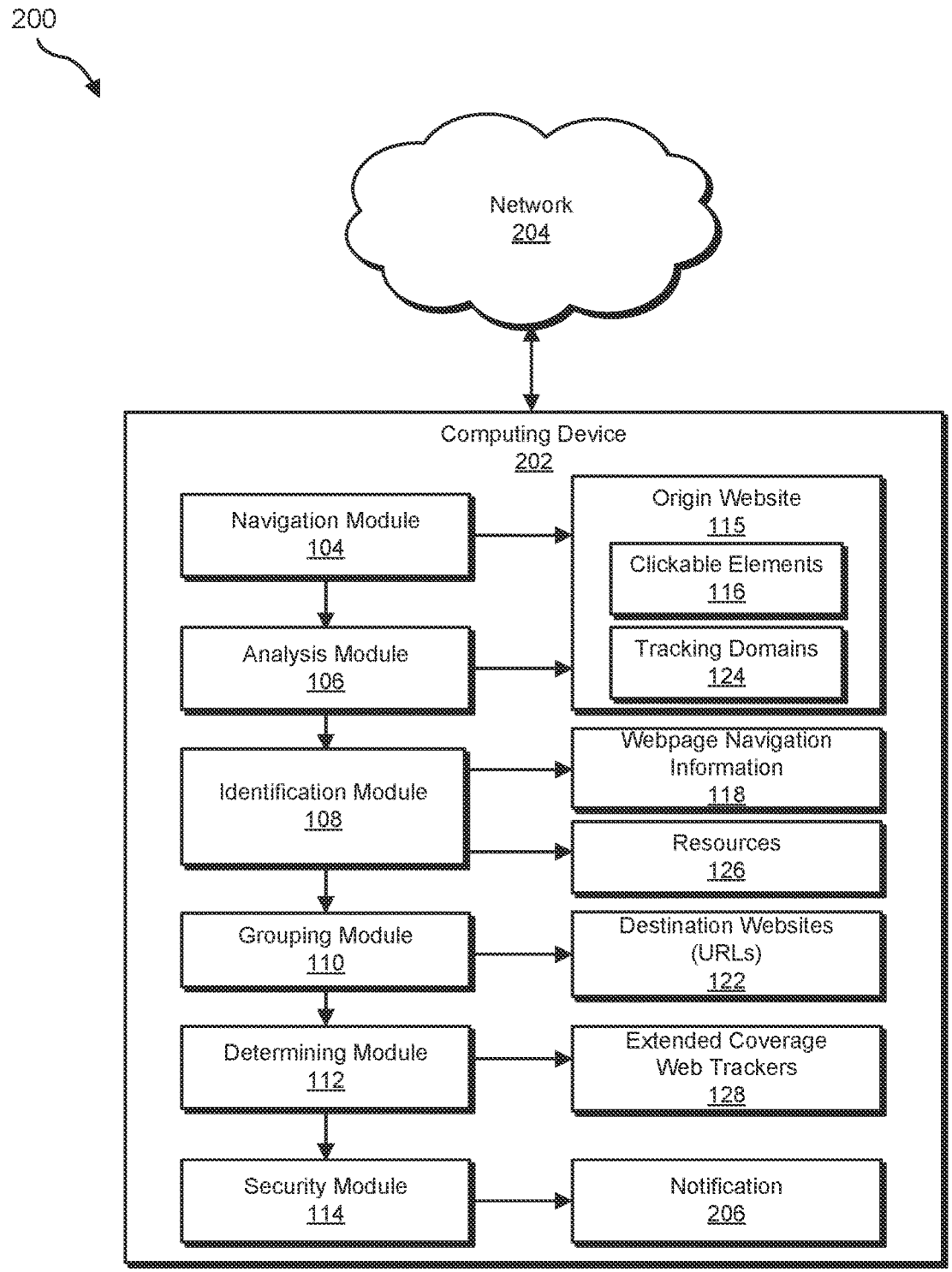
FIG. 2 is a block diagram of an additional example system for protecting user data privacy by detecting the extension of tracker coverage of website browsing sessions through indirect data disclosure.

The following will provide, with reference to FIGS. 1-2, detailed descriptions of example systems for protecting user data privacy by detecting the extension of tracker coverage of website browsing sessions through indirect data disclosure. Detailed descriptions of corresponding computer-implemented methods will also be provided in connection with FIGS. 3-4. Additionally, a detailed description of example security actions that may be performed in an example system for protecting user data privacy by detecting the extension of tracker coverage of website browsing sessions through indirect data disclosure, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting user data privacy by detecting the extension of tracker coverage of website browsing sessions through indirect data disclosure.

As illustrated in this figure, example system 100 may include one or more modules 102 for performing one or more tasks. As will be explained in greater detail below, modules 102 may include a navigation module 104 that navigates to an origin website 115 during a new web browsing session. Example system 100 may additionally include an analysis module 106 that analyzes origin website 115 to detect clickable elements 116 and tracking domains 124. Example system 100 may also include an identification module 108 that identifies webpage navigation information 118 for destination websites 122 and resources 126 loaded by tracking domains 124 in outgoing data traffic associated with a selection clickable elements 116. Example system 100 may additionally include a grouping module 110 that groups webpage navigation information 118 for destination websites 122 by a common destination tracking domain. Example system 100 may also include a determining module 112 that determines extended coverage web trackers 128 that extend a tracker coverage from origin website 115 to destination websites 122. Example system 100 may additionally include a security module 114 that performs a security action that protects against a potential invasion of user data privacy by providing a notification of extended tracker coverage during a browsing session in origin website 115.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the device illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting user data privacy by detecting the extension of tracker coverage of website browsing sessions through indirect data disclosure. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store origin website 115 including clickable elements 116. Data storage 120 may also store webpage navigation information 118, destination websites 122, tracking domains 124 (including resources 126), and extended coverage web trackers 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to protect user data privacy by detecting the extension of tracker coverage of website browsing sessions through indirect data disclosure.

For example, navigation module 104 may navigate to origin website 115 during a new web browsing session. Then, analysis module 106 may analyze origin website 115 to detect clickable elements 116 and tracking domains 124. Next, identification module 108 may identify webpage navigation information 118 for destination websites 122 (which may be identified by uniform resource locators (URLs)) and resources 126 loaded by tacking domains 124 in outgoing data traffic associated with the selection of clickable elements 116. Then, grouping module 110 may group webpage navigation information 118 for destination websites 122 by a common destination tracking domain. Next, determining module 112 may determine extended coverage web trackers 128 that extend a tracker coverage from origin website 115 to destination websites 122. Finally, security module 114 may perform a security action that protects against a potential invasion of user privacy by providing a notification of extended tracker coverage during a browsing session in origin website 115.

Computing device 202 generally represents any type or form of computing device capable of reading and/or executing computer-executable instructions. In some examples, computing device 202 may be a server running client-side security software including online privacy protection in connection with user web browsing sessions. In some examples, computing device 202 may represent a plurality of servers that work and/or operate in conjunction with one another. In other examples, computing device 202 may be an endpoint device running client-side security software including online privacy protection in connection with user web browsing sessions. Additional examples of computing device 202 include, without limitation, security servers, application servers, web servers, storage servers, and/or database servers configured to run certain software applications and/or provide various security, web, storage, and/or database services, laptops, tablets, desktops, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and other computing devices. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
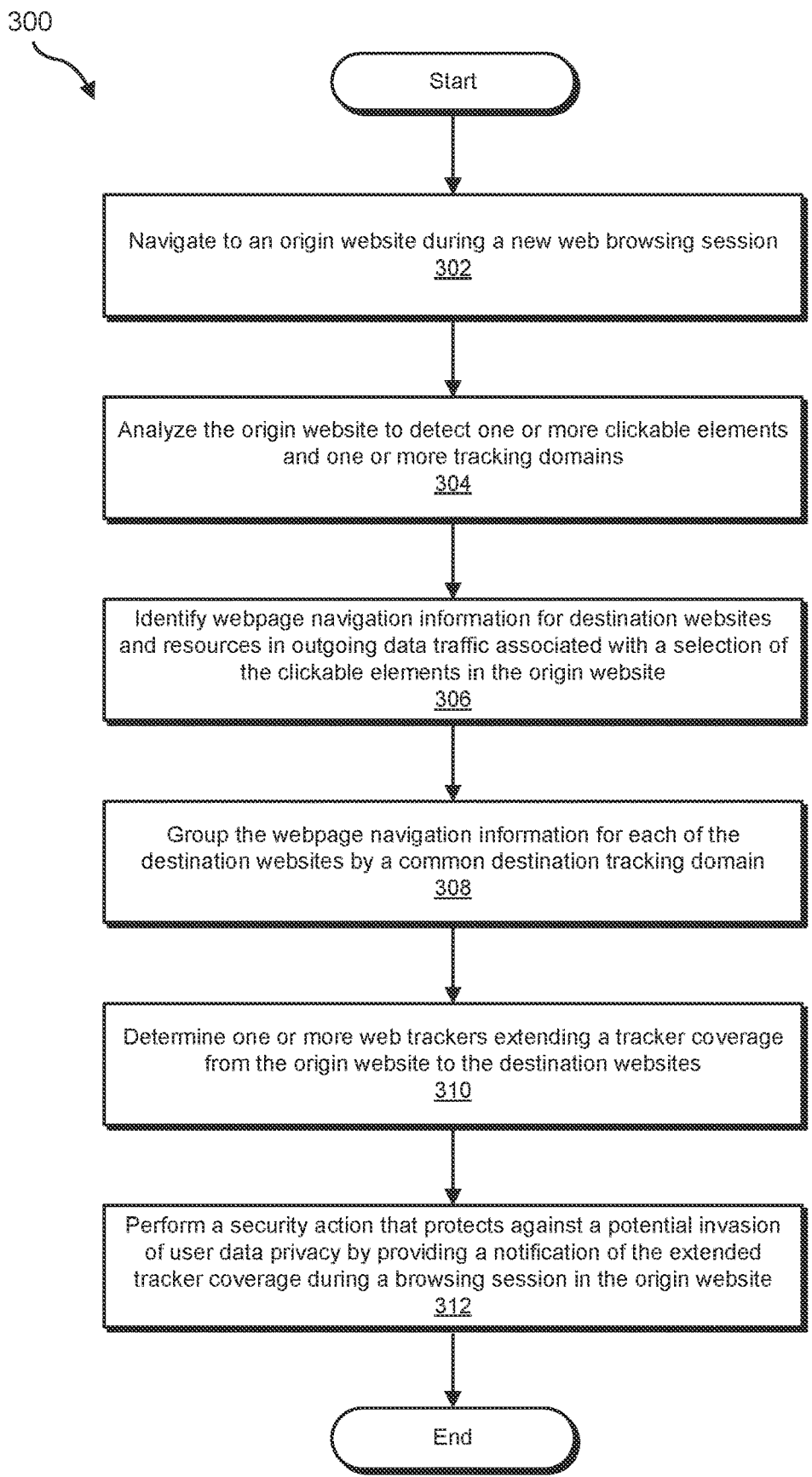
FIG. 3 is a flow diagram of an example method for protecting user data privacy by detecting the extension of tracker coverage of website browsing sessions through indirect data disclosure.

FIG. 3 is a flow diagram of an example computer-implemented method 300 for protecting user data privacy by detecting the extension of tracker coverage of website browsing sessions through indirect data disclosure. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may navigate to an origin website during a new web browsing session. For example, navigation module 104 may, as part of computing device 202 in FIG. 2, navigate to origin website 115 during a new web browsing session initiated in a web browser.

Navigation module 104 may navigate to origin website 115 in a variety of ways. In some examples, navigation module 104 may initiating the new web browsing session by utilizing a custom browser to load a new website (i.e., origin website 115) that is unassociated with previous visits (e.g., origin website 115 was not navigated to during a previous web browsing session on computing device 202). Additionally, in order to avoid the possibility of misclassified network traffic requests (e.g., xmlhttprequest), navigation module 104 may be configured to tamper the creation of service workers (i.e., event-driven programming code) that would mask the nature of network traffic requests (e.g., navigator.serviceWorker.register). Then, navigation module 104 may browse to origin website 115 within the custom browser.

At step 304, one or more of the systems described herein may analyze the origin website to detect one or more clickable elements and one or more tracking domains. For example, analysis module 106 may, as part of computing device 202 in FIG. 2, analyze origin website 115 to detect clickable elements 116 and tracking domains 124. In some embodiments, tracking domains 124 may include website domain names associated with web trackers.

Analysis module 106 may analyze origin website 115 in a variety of ways. In some embodiments, analysis module 106 may identify HTML elements (e.g., page.click('example')) that are associated with click events in a webpage associated with origin website 115. The term "click events," as used herein, generally refers to any input (e.g., mouse or other pointing device, keyboard input (e.g., cursor) touch input, voice input, etc.) for navigating and/or interacting with a website (e.g., by selecting links to navigate to other websites or webpages within the same website). Additionally, analysis module 106 may identify HTML elements describing executable web tracking code for loading resources 126 associated with tracking domains 124.

At step 306, one or more of the systems described herein may identify webpage navigation information for destination websites and resources in outgoing data traffic associated with a selection of the clickable elements in the origin website. For example, identification module 108 may, as part of computing device 202 in FIG. 2, identify webpage navigation information 118 for destination websites 122 (i.e., websites navigated to from origin website 115) and resources 126 (i.e., tracking domain resources) associated with a selection of each of clickable elements 116 in origin website 115.

Identification module 108 may analyze origin website 115 in a variety of ways. In some examples, identification module 108 may detect URLs associated with webpage navigation requests to destination websites 122 in the outgoing traffic in response to the selection of clickable elements 116 in origin website 115. For examples, in response to clicking on an HTML element page.click('example')) to navigate to a URL for a destination website 122, identification module 108 may analyze the outgoing traffic that happens in the web browser (e.g., webRequest.onbeforesendheaders). Additionally, upon detecting a page navigation (e.g., main_frame URLs), identification module 108 may record (i.e., store) all of the associated header information. Once the header information is stored, identification module 108 may then finalize loading of resources 126 in a browsing context (e.g., tabs.executeScript ({code:'window.stop'})) and close newly opened browser tabs (e.g., tabs.remove).

At step 308, one or more of the systems described herein may group the webpage navigation information for each of the destination websites by a common destination tracking domain. For example, after obtaining all of the destination 'main_frame' URLs and headers as well as tracking domains 124 loading resources 126 in origin website 115, grouping module 210 may, as part of computing device 202 in FIG. 2, group webpage navigation information 118 for each of destination websites 122 by a common destination tracking domain (i.e., a common tracking domain 124).

Grouping module 110 may group webpage navigation information 118 in a variety of ways. In some examples, grouping module 110 may truncate (i.e., shorten) the different URLs associated with each of destination websites 122 and group them together by a common domain (e.g., 'a.com/a' and 'a.com/b' are grouped under 'a.com'). Additionally, if origin website 115 is found to include referrer information as URL in a generated request, grouping module 110 may browse to the referrer information.

At step 310, one or more of the systems described herein may determine one or more web trackers extending a tracker coverage from the origin website to the destination websites. For example, determining module 112 may, as part of computing device 202 in FIG. 2, determine extended coverage web trackers 128 that extend a tracker coverage from origin website 115 to one or more destination websites 122.

Determining module 112 may determine extended coverage web trackers 128 in a variety of ways. In some examples, determining module 112 may identify one or more candidate web trackers that are loaded by destination websites 122 and absent from origin website 115. For example, if determining module 112 only detects "Tracker B" and "Tracker C" in origin website 115 but detects "Tracker D" and Tracker E" in one or more destination websites 122 (i.e., destination domains), then determining module may obtain a general estimation range of the extended coverage of newly found trackers "Tracker D" and "Tracker E." Additionally or alternatively, determining module may perform a fine-grained analysis to determine extended coverage web trackers 128 which will now be described with respect to FIG. 4.

Figure 4:
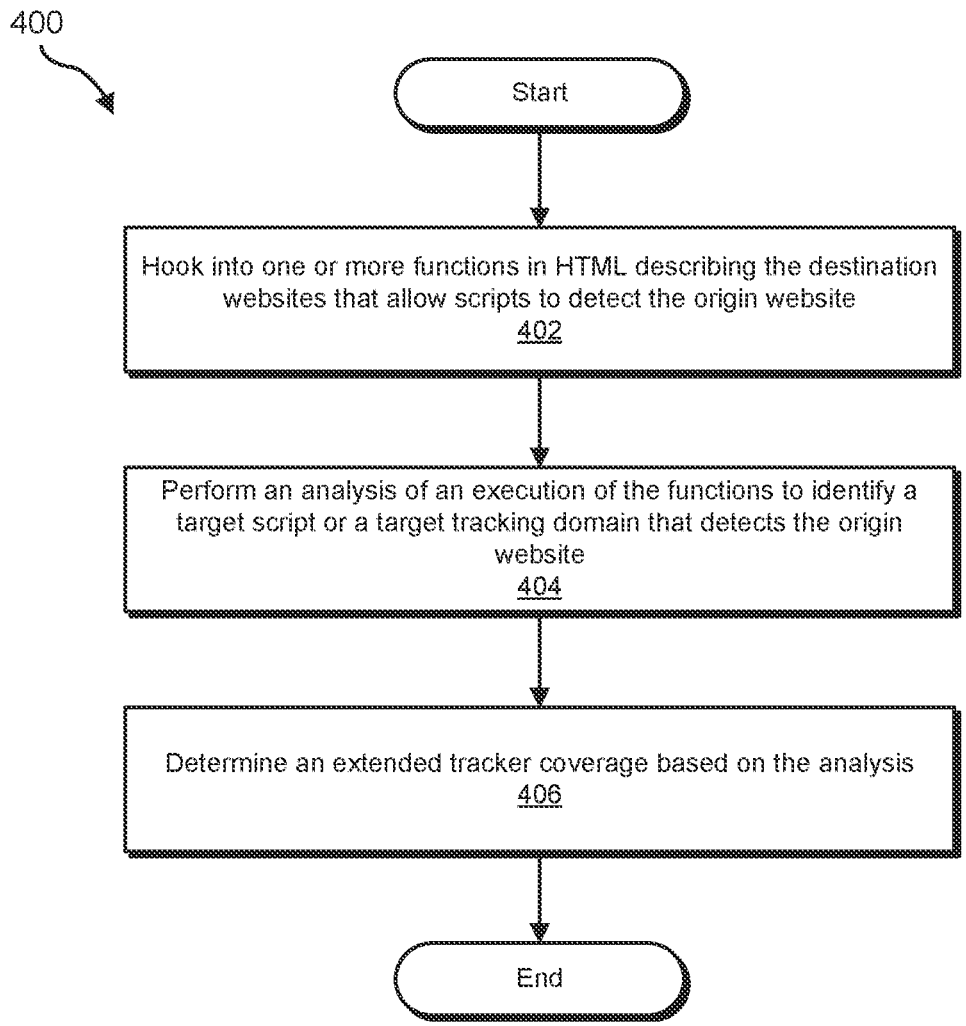
FIG. 4 is a flow diagram of an example method for determining web trackers extending a tracker coverage from an origin website during a website browsing session.

Turning now to FIG. 4, a flow diagram of an example computer-implemented method 400 for determining web trackers extending a tracker coverage from an origin website during a website browsing session, will now be described. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may hook into one or more functions in HTML describing the destination websites that allow scripts to detect the origin website navigate to an origin website during the web browsing session. For example, determining module 112 may, as part of computing device 202 in FIG. 2, hook into functions that allow scripts to detect origin website 115 (e.g., document.referrer).

At step 404, one or more of the systems described herein may perform an analysis of an execution of the functions to identify a target script or a target tracking domain that detects the origin website. For example, determining module 112 may, as part of computing device 202 in FIG. 2, dynamically analyze an execution context and trace it back to the specific script or tracking domain 124 obtaining information (e.g., error.captureStackTrace).

At step 406, one or more of the systems described herein may determine an extended tracker coverage based on the analysis performed at step 404. For example, determining module 112 may determine the coverage increase of a corresponding web tracker (i.e., determine an extended coverage web tracker 128) based on the aforementioned analysis.

Returning now to FIG. 3, at step 312, one or more of the systems described herein may perform a security action that protects against a potential invasion of user data privacy by providing a notification of the extended tracker coverage during a browsing session in the origin website. For example, security module 114 may, as part of computing device 202 in FIG. 2, perform a security action that generates notification 206 of extended coverage web trackers 128.

Figure 5:
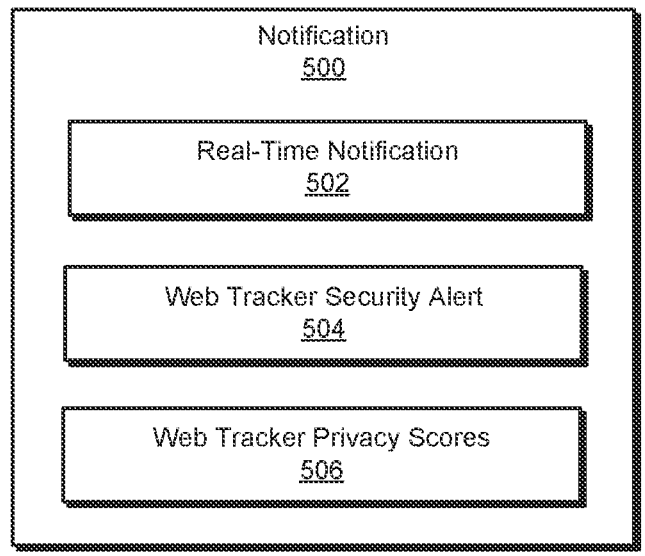
FIG. 5 is a block diagram showing example security actions that may be performed in an example system for protecting user data privacy by detecting the extension of tracker coverage of website browsing sessions through indirect data disclosure.

Security module 114 may generate notification 206 in a variety of ways which will now be described with respect to FIG. 5. As shown in FIG. 5, a notification 500 may include a real-time notification 502 that may be utilized to inform a web browser user about extended coverage web trackers 128 in real-time. For example, security module 114 may be configured to implement a lightweight version of the computer-implemented methods described in FIGS. 3-4 above, in a browser extension or a custom web browser.

Additionally or alternatively, notification 500 may include a web tracker security alert 504 to inform a web browser user about extended coverage web trackers 128 following a browsing session. Additionally or alternatively, notification 500 may include web tracker privacy scores 506. In some examples, web tracker privacy scores 506 may include enriched privacy scores (e.g., privacy scores supplemented with information about extended coverage web trackers 128) generated by a security application for detecting privacy invasive web trackers.

As explained in connection with method 300 above, the systems and methods described herein provide for protecting user data privacy by detecting the extension of tracker coverage of website browsing sessions through indirect data disclosure. The systems and methods described herein may perform an analysis of website navigations in response to click events, such as mouse clicks, between an origin website and one or more destination websites during a clean browsing session (i.e., origin click analysis) and further performing an analysis of outgoing data traffic to detect referrer information associated with destination domains (i.e., destination referrer check). Based on this analysis, the systems and methods described herein may identify extended web tracker coverage by trackers that are loaded in the destination websites but not in the origin website, thereby protecting user data privacy by providing information that may be utilized to inform users of potentially privacy invasive web trackers.

Figure 6:
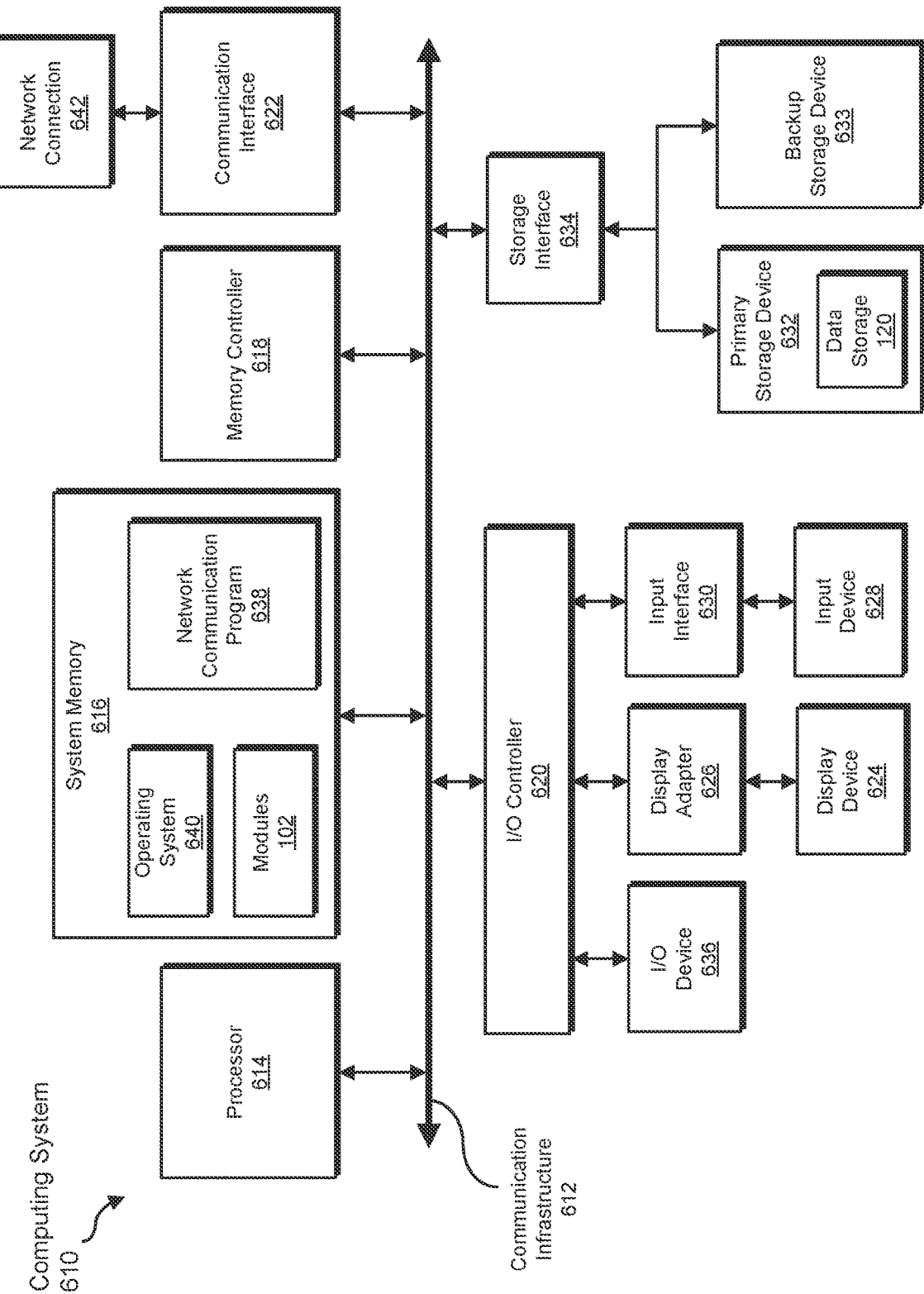
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
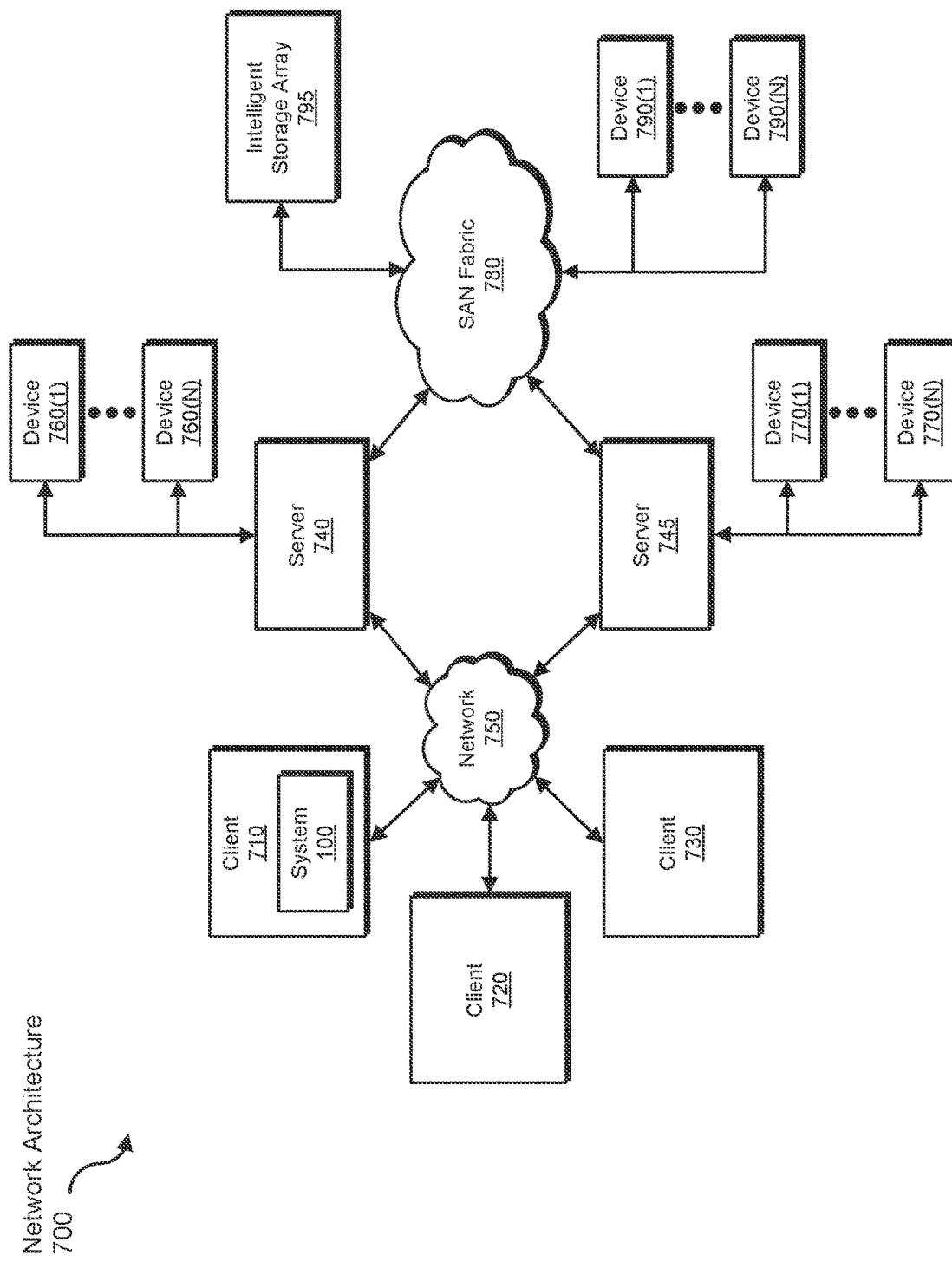
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting user data privacy by detecting the extension of tracker coverage of website browsing sessions through indirect data disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user data privacy by detecting an extension of tracker coverage of website browsing sessions through indirect data disclosure, at least a portion of the method being performed by one or more computing devices comprising at least one processor, the method comprising:
    navigating, by the one or more computing devices, to an origin website during a new web browsing session, wherein navigating to the origin website includes preventing a creation of event-driven programming code that masks web server requests;
    analyzing, by the one or more computing devices, the origin website to detect one or more clickable elements and one or more tracking domains;
    identifying, by the one or more computing devices, webpage navigation information for destination websites and resources loaded by the tracking domains in outgoing data traffic associated with a selection of each of the clickable elements in the origin website;
    grouping, by the one or more computing devices, the webpage navigation information for each of the destination websites by a common destination tracking domain;
    determining, by the one or more computing devices, one or more web trackers extending a tracker coverage from the origin website to the destination websites, based on the webpage navigation information and the resources loaded by the tracking domains; and
    performing, by the one or more computing devices, a security action that protects against a potential invasion of user data privacy by providing a notification of the extended tracker coverage during a browsing session in the origin website.

2. The computer-implemented method of claim 1, wherein navigating to the origin website during the new web browsing session comprises:
    initiating the web browsing session in a browser application;
    preventing, within the browsing application, the creation of event-driven programming code that masks web server requests; and
    browsing to the origin website within the browsing application.

3. The computer-implemented method of claim 1, wherein analyzing the origin website to detect the clickable elements and the tracking domains comprises:
    identifying hypertext markup language (HTML) elements associated with click events in a webpage associated with the origin website; and
    identifying HTML elements describing executable web tracking code for loading resources associated with the tracking domains.

4. The computer-implemented method of claim 1, wherein identifying the webpage navigation information for the destination websites and the resources loaded by the tracking domains comprises:
    detecting one or more universal resource locators (URLs) associated with webpage navigation requests to the destination websites in the outgoing traffic in response to the selection of the clickable elements in the origin website;
    storing header information for the clickable elements associated with the page navigation requests; and
    executing web tracking code utilized for resource loading by the origin website during the new browsing session to obtain the tracking domains.

5. The computer-implemented method of claim 1, wherein grouping the webpage navigation information for each of the destination websites by the common destination tracking domain comprises:
    truncating each of a plurality of different URLs associated with the destination websites; and
    grouping the truncated different URLs by the common destination tracking domain.

6. The computer-implemented method of claim 1, wherein determining the web trackers extending the tracker coverage from the origin website to the destination websites, based on the webpage navigation information and the resources loaded by the tracking domains comprises:
    identifying one or more candidate web trackers that are loaded by the destination websites and absent from the origin website; and
    determining an estimation range of extended tracker coverage associated with the candidate web trackers.

7. The computer-implemented method of claim 1, wherein determining the web trackers extending the tracker coverage from the origin website to the destination websites, based on the webpage navigation information and the resources loaded by the tracking domains comprises:
    hooking into one or more functions in HTML describing the destination websites that allow scripts to detect the origin website;
    performing an analysis of an execution of the functions to identify at least one of a target script or a target tracking domain that detects the origin website; and
    determining an extended tracker coverage based on the analysis.

8. The computer-implemented method of claim 1, wherein performing the security action that protects against a potential invasion of user data privacy by providing a notification of the extended tracker coverage during a browsing session in the origin website comprises utilizing a browser extension to provide a real-time notification of the extended tracker coverage during the browser session.

9. The computer-implemented method of claim 1, wherein performing the security action that protects against a potential invasion of user data privacy by providing a notification of the extended tracker coverage during a browsing session in the origin website comprises including the notification in a web tracker security alert.

10. The computer-implemented method of claim 1, wherein performing the security action that protects against a potential invasion of user data privacy by providing a notification of the extended tracker coverage during a browsing session in the origin website comprises adding the notification to one or more privacy scores generated for privacy invasive web trackers.

11. A system for protecting user data privacy by detecting an extension of tracker coverage of website browsing sessions through indirect data disclosure, the system comprising:
   at least one physical processor;
   physical memory comprising computer-executable instructions and one or more modules that, when executed by the physical processor, cause the physical processor to:
      navigate, by a navigation module, to an origin website during a new web browsing session, wherein navigating to the origin website includes preventing a creation of event-driven programming code that masks web server requests;
      analyze, by an analysis module, the origin website to detect one or more clickable elements and one or more tracking domains;
      identify, by an identification module, webpage navigation information for destination websites and resources loaded by the tracking domains in outgoing data traffic associated with a selection of each of the clickable elements in the origin website;
      group, by a grouping module, the webpage navigation information for each of the destination websites by a common destination tracking domain;
      determine, by a determining module, one or more web trackers extending a tracker coverage from the origin website to the destination websites, based on the webpage navigation information and the resources loaded by the tracking domains; and
      perform, by a security module, a security action that protects against a potential invasion of user data privacy by providing a notification of the extended tracker coverage during a browsing session in the origin website.

12. The system of claim 11, wherein the navigation module navigates to the origin website during the new web browsing session by:
   initiating the web browsing session in a browser application;
   preventing, within the browsing application, the creation of event-driven programming code that masks web server requests; and
   browsing to the origin website within the browsing application.

13. The system of claim 11, wherein the analysis module analyzes the origin website to detect the clickable elements and the tracking domains by:
   identifying hypertext markup language (HTML) elements associated with click events in a webpage associated with the origin website; and
   identifying HTML elements describing executable web tracking code for loading resources associated with the tracking domains.

14. The system of claim 11, wherein the identification module identifies the webpage navigation information for the destination websites and the resources loaded by the tracking domains by:
   detecting one or more universal resource locators (URLs) associated with webpage navigation requests to the destination websites in the outgoing traffic in response to the selection of the clickable elements in the origin website;
   storing header information for the clickable elements associated with the page navigation requests; and
   executing web tracking code utilized for resource loading by the origin website during the new browsing session to obtain the tracking domains.

15. The system of claim 11, wherein the grouping module groups the webpage navigation information for each of the destination websites by the common destination tracking domain by:
   truncating each of a plurality of different URLs associated with the destination websites; and
   grouping the truncated different URLs by the common destination tracking domain.

16. The system of claim 11, wherein the determining module determines the web trackers extending the tracker coverage from the origin website to the destination websites, based on the webpage navigation information and the resources loaded by the tracking domains by:
   identifying one or more candidate web trackers that are loaded by the destination websites and absent from the origin website; and
   determining an estimation range of extended tracker coverage associated with the candidate web trackers.

17. The system of claim 11, wherein the determining module determines the web trackers extending the tracker coverage from the origin website to the destination websites, based on the webpage navigation information and the resources loaded by the tracking domains by:
   hooking into one or more functions in HTML describing the destination websites that allow scripts to detect the origin website;
   performing an analysis of an execution of the functions to identify at least one of a target script or a target tracking domain that detects the origin website; and
   determining an extended tracker coverage based on the analysis.

18. The system of claim 11, wherein the security module performs the security action that protects against a potential invasion of user data privacy by providing a notification of the extended tracker coverage during a browsing session in the origin website by utilizing a browser extension to provide a real-time notification of the extended tracker coverage during the browser session.

19. The system of claim 11, wherein the security module performs the security action that protects against a potential invasion of user data privacy by providing a notification of the extended tracker coverage during a browsing session in the origin website by including the notification in a web tracker security alert.

20. A non-transitory computer-readable medium comprising one or more computer-executable instructions that, when executed by at least one processor of a computing device, cause the computing device to:
   navigate to an origin website during a new web browsing session, wherein navigating to the origin website includes preventing a creation of event-driven programming code that masks web server requests;

analyze the origin website to detect one or more clickable elements and one or more tracking domains;
identify webpage navigation information for destination websites and resources loaded by the tracking domains in outgoing data traffic associated with a selection of each of the clickable elements in the origin website;
group the webpage navigation information for each of the destination websites by a common destination tracking domain;
determine one or more web trackers extending a tracker coverage from the origin website to the destination websites, based on the webpage navigation information and the resources loaded by the tracking domains; and
perform a security action that protects against a potential invasion of user data privacy by providing a notification of the extended tracker coverage during a browsing session in the origin website.

\* \* \* \* \*